US006571671B1

(12) United States Patent
Giannetti

(10) Patent No.: US 6,571,671 B1
(45) Date of Patent: Jun. 3, 2003

(54) QUICK CHANGE TOOL POST HAVING LATERALLY OFF-SET DOVETAIL CONNECTIONS

(76) Inventor: Enrico R. Giannetti, Rte. 2, Box 75B, East Bernard, TX (US) 77435

( * ) Notice: Subject to any disclaimer, the term of this patent is extended or adjusted under 35 U.S.C. 154(b) by 87 days.

(21) Appl. No.: 09/676,060

(22) Filed: Sep. 29, 2000

(51) Int. Cl.[7] .......................... B23B 27/00; B23B 29/00
(52) U.S. Cl. .............................. 82/160; 82/161; 82/158
(58) Field of Search .......................... 82/160, 161, 158, 82/159, 120, 121, 162, 164, 173

(56) References Cited

U.S. PATENT DOCUMENTS

| 4,126,067 A | 11/1978 | Giannetti |
| 4,286,485 A | * 9/1981 | Dezvane et al. .............. 82/158 |
| 4,823,656 A | 4/1989 | Weil |
| 5,063,799 A | 11/1991 | Brewer |
| 6,003,415 A | 12/1999 | Turner et al. |
| 6,230,595 B1 | * 5/2001 | Kranjac .................. 324/207.21 |
| 6,295,905 B1 | * 10/2001 | Hargis et al. ................. 407/81 |

* cited by examiner

Primary Examiner—Henry W. H. Tsai
(74) Attorney, Agent, or Firm—James L. Jackson; Andrews & Kurth, LLP

(57) ABSTRACT

A quick-change tool post, having a rectangular tool post body with a bore there through defining an axis of rotation. The body defines a plurality of generally rectangular tool support faces and a plurality of laterally offset external dovetail connections receiving internal dovetail connections of overlapping tool support members. A post extends through the body and defines a pivot about which the body is rotatable. An indexing mechanism having locking and unlocking conditions permits unlocking of the post during a first increment of rotational locking handle movement and rotation of the post during a second increment of rotational movement of the handle in the same rotational direction.

19 Claims, 10 Drawing Sheets

QUICK CHANGE TOOL POST HAVING LATERALLY OFF-SET DOVETAIL CONNECTIONS

BACKGROUND OF THE INVENTION

1. Field of the Invention

This invention pertains generally to tool posts for machine tools such as lathes and the like and more particularly to an improved tool post mechanism for supporting a plurality of tool holders each having metal working tools, with the tool post capable of being locked at a selected position with respect to a moving, typically rotating work-piece and capable of being unlocked and rotatable to a selected rotary position to operatively position any selected metal working tool thereof in desired working orientation with respect to the work-piece. More particularly, the present invention concerns a quick-change tool post having a single actuating handle which achieves unlocking of an indexing mechanism during a first rotational increment of handle movement and achieves rotation of the tool post to a selected position during another increment of rotational movement, followed by achieving locking of the tool post at the selected position upon an opposite increment of rotational movement. Even further, the present invention concerns a quick change tool post having internal channels for coolant flow controlling capability and having laterally off-set dovetail connections enabling connection of standard rectangular tool supports thereto.

2. Description of the Prior Art

A variety of tool posts have in the past been evolved which hold a plurality of tool holders in which tools for operation on a workpiece held on a machine tool such as a lathe, may be held. Such previously evolved multiple tool holding tool posts have served to increase the speed and facility with which any given machining operation may be performed in that the setup time for positioning any given tool with respect to a workpiece may be minimized.

The present inventor's U.S. Pat. No. 4,126,067 is an example of a quick-change indexing tool post for supporting a plurality of metal working tools and for enabling rapid selective positioning of any selected one of the metal working tools in operative metal working relation to a workpiece that is movably, i.e., rotatably supported on a machine tool such as a lathe.

As shown in FIG. 1 of applicant's U.S. Pat. No. 4,126,067 in order to enable four tool holders to be mounted to the tool post, lateral edges of each of the tool holders must be beveled at the edges thereof at an angle of 45 degrees so that a tool holder can be mounted to each tool support, face of the tool post and adjacent tool holders will not interfere with one another. Thus, special tool holders are required for this particular type of tool post.

It is well known that virtually that all machine shops operating in the United States at the present time have a number of conventional "rectangular" tool holders which, because of their size and rectangular configuration, cannot be mounted to the tool post body shown in applicant's prior patent. It is desirable therefore to provide a tool post construction which enables conventional rectangular tool posts to be mounted to the tool post body, thus enabling machine shops to make wide use of conventional rectangular tool holders and thus minimizing the inventory requirements that might otherwise be necessary to enable wide use of quick-change tool posts of this nature. The conventional rectangular tool holders typically have a width from side to side, substantially equaling the width of a rectangular tool post body or the width of a tool supporting face of a tool post for supporting multiple metal working tools. Thus, for mounting the rectangular tool holders to the bed of a machine tool, the tool holders must be beveled at the sides, must be of narrow width or the tool post structure must be of exceptionally large size. Any of these possibilities would be detrimental to the cost and structural integrity of the tool supporting components of the machine tool or tool post. Thus, it is considered desirable to provide a tool post construction of relatively small dimension, i.e., having tool support faces of no greater width that the width of standard tool holders and yet being capable of supporting a metal working tool at each of the multiple tool support faces of the tool post. It is also desirable to provide a tool post mechanism having a generally rectangular tool post body having four tool support faces each having a dovetail connection and being capable of supporting four rectangular tool support elements each having substantially the same width as the tool post body and having a mating dovetail connection to achieve mounting thereof.

Since virtually all machining operations require the presence of a coolant liquid which is continuously applied to the cutting tool and to the work-piece being movably supported by the machine, to thus prolong the active service life of the metal working tool being utilized and to minimize machining vibration. Though most machining operations are provided with coolant supply conduits, these conduits must be individually oriented typically by a manual operation to enable adequate supply of coolant intimately to the metal working site. Also, when indexing tool posts are employed during machining, the machinist must reposition the coolant supply conduit each time the tool post is rotated to a new position. This disadvantage adds significantly to machine time and thus adversely influences machining costs. At times, machinists manually adjust the position of the coolant supply conduits during operation of a machine and thus get hands, arms and clothing dangerously close to the rotating work-piece, thus presenting a safety hazard. It is desirable therefore, to provide a tool post construction having a coolant supply system which automatically, without any manual selection or positioning activity of the machinist, delivers a supply of coolant only to a selected metal working tool and which is oriented precisely to the metal working operation of any selected metal working tool supported thereby.

Most present day tool post designs, in order the achieve rotation of the tool post to position a selected tool in operative relation with the work piece, require that the tool post initially be unlocked and then require that the tool be manually rotated to a selected position. Typically, the tool post is unlocked by first loosening a locking nut and then rotating a locking handle of an indexing head to an unlocked position. After this has been done, the tool post may then be selectively and manually rotated to a desired position, after which the tool post is again locked by rotating the locking handle in an opposite rotary direction for locking the tool post and securing it in immovable relation with the bed of a machine tool. Thus, for unlocking, rotating and relocking the tool posts, multiple manual movements are required on behalf of the machinists and a considerable amount of machine down time is also required to achieve selective positioning of a metal working tool being supported by the tool post. It is desirable, therefore, to provide an improved tool post design which enables the tool post to be unlocked and rotated to a selected position by a single rotational movement of a locking handle or ratcheted to a desired position by successive ratcheting movements of an actuating handle and then again locked by rotating the locking handle in the opposite rotational direction. This "one-hand" locking, positioning and relocking procedure can be done quite rapidly, thus materially enhancing the productivity of the machining operation that is being done.

Many quick-change tool posts are provided with "external" indexing mechanisms where portions of the indexing splines protrude beyond the lateral tool support faces of the rectangular tool post body. In these cases, the tool holders that are to be releasably mounted to the dovetail mounting connections must have cut-outs that enable the tool holders to clear the protruding edges of the indexing mechanism or its enclosure. The standard rectangular tool holders that are typically present in large numbers in virtually every machine shop cannot be fully assembled to these types of tool posts because of the protruding edge portions of the indexing mechanism. Thus "special" tool support devices are required, which have cutouts for the protruding portions of the external indexing mechanism. These cutouts obviously weaken the structural integrity of the tool supports, so that the tool supports are less rigid as compared with the rigidity or structural integrity of standard rectangular tool holders. This shortcoming becomes especially critical or important when the metal working tool supported thereby is engaged in making a heavy roughing cut on the work-piece. It is desirable therefore to provide a tool post mechanism which has an internal indexing mechanism, thus eliminating the need for special tool supports having cutouts and facilitating the use of standard rectangular tool supports which are adapted for full length dovetail engagement with the dovetail mounting connections of the tool post body.

SUMMARY OF THE INVENTION

It is therefore a principal feature of the present invention to provide a novel quick-change tool post mechanism having laterally offset dovetail connections which enable the use of standard rectangular tool supports so that the tool support inventory of machine shops can be minimized;

It is another feature of the present invention to provide a novel quick-change indexing tool post mechanism having an indexing system permitting unlocking and selective rotation of the tool post to a desired operating position by rotational movement of a locking handle in a single rotational direction followed by locking of the tool post mechanism at the selected position by opposite rotation of the locking handle so that unlocking, rotation and relocking of the tool post can be accomplished by one-handed operation of the machinist using the metal working machine.

It is also a feature of the present invention to provide a novel quick-change indexing tool post mechanism having a coolant supply system which conducts a flow of coolant liquid in a manner directing the coolant to the site of the metal working tool that is selected by rotary positioning of the tool post mechanism;

It is another feature of the present invention to provide a novel quick-change indexing tool post mechanism having an internal indexing mechanism and thereby enabling the various tool support devices in assembly therewith to be of maximum rigidity so that the metal working tool supporting thereby is as stable as possible during the metal working operation.

Briefly, the various objects and features of the present invention are realized by providing a generally rectangular tool post body which is specifically designed to receive standard, rectangular tool supports. The tool post body defines a plurality, typically four, generally planar tool support faces having essentially the same width and the width of standard rectangular tool holders. The tool post body at each of the tool support faces defines a first dovetail tool mount connection which is typically an external dovetail connection, though internal dovetail connections may be employed if desired. The generally rectangular tool mounting faces of the tool post body each define centerlines that are oriented and generally parallel relation with the centerline of the holding post about which the tool post body is mounted for rotation. The dovetail tool mount connections which are defined by each of the tool support faces of the tool post body each define dovetail face centerlines that are offset laterally with respect to the mounting face centerlines of the tool post body so that standard, rectangular tool supports may be assembled to the tool post body with one of the sides thereof extending beyond a respective side of the tool post body and disposed in overlapping relation with the side of an adjacent conventional rectangular tool support. This feature permits each of the tool supports to be of standard rectangular character and to have maximum structural integrity and rigidity to thereby provide for optimum support of each of the metal working tools being supported by the respective tool support devices. Moreover, the quick-change indexing tool post mechanism of the present invention is provided with an internal interengaging spline type indexing mechanism so that no portion of the indexing splines or indexing elements protrude the tool mounting faces of the rectangular tool post body or beyond the dovetail connections. Thus, the tool support elements are not required to have cutouts and standard, rectangular tool supports may be utilized which establish full length dovetail interconnection with the dovetail connection mounts of the tool post body.

In the preferred embodiment of the present invention, the centrally located holding post of the quick-change tool post mechanism is provided with a longitudinal coolant supply channel which is in communication with the pressurized coolant supply of the machine tool. Other components of the quick-change tool post mechanism, such as the sleeve type indexing post and the indexing head, define coolant ports and channels which establish communication with the coolant supply channel of the holding posts so that coolant is supplied only to a selected metal working tool at any point in time. Moreover, the supply of coolant to the selective metal working tool is automatic upon selective positioning of the tool post body and thus does not require any manual time consuming activity on the part of the machinist using the machine tool.

The tool post body is provided with an indexing recess at its bottom portion which receives a top spline element which is fixed to the tool post body and a bottom spline element which is retained in non-rotatable assembly with the sleeve type indexing post. A stack of disc springs is interposed between the bottom spline element and the tool post body to continuously urge the bottom spline toward a direction of separation from the top spline. The top and bottom splines are maintained in inter-engaging relation by a locking or actuating nut which is in threaded engagement with threads of the indexing post and which bears against an indexing head that is fixed to the tool post body. The locking nut is provided with a locking handle which is rotated to impart rotational locking or unlocking movement to the locking nut. During the rotary unlocking movement the locking nut is driven counter-clockwise, thus permitting the disc springs to shift the tool post body and its top spline upwardly, thus separating the top spline from the bottom spline and positioning the splines out of locking engagement. After this unlocking movement has occurred, continuing movement of the locking handle through a second increment of rotary movement, achieves rotary positioning of the tool post body so as to position a selected metal working tool in operative relation with the moving work piece. After such positioning, the locking handle is actuated to accomplish rotary movement of the locking nut in the clockwise direction thereby driving the indexing post upwardly relative to the tool post body and forcing the top and bottom splines to establish inter-engaging locking relation against the mechanical bias of the disc springs.

Each of the dovetail connections of the tool post body defines a wedge or gib receptacle within which is located a dovetail expansion plate or gib element. Each of the dovetail connections is also provided with a rotary gib actuator having an eccentric surface in contact with the gib element. As the rotary actuator is rotated, typically by an Allen wrench, the gib element is moved linearly, thereby expanding the dovetail connection and locking the respective tool holder firmly and securely to the tool post body. The mechanical force generated by the eccentric surface on the gib element is effective to prevent movement of the tool support element relative to the tool post body even when the tool is engaged in heavy, rough metal cutting operations.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

IN THE DRAWINGS

Figure 1:
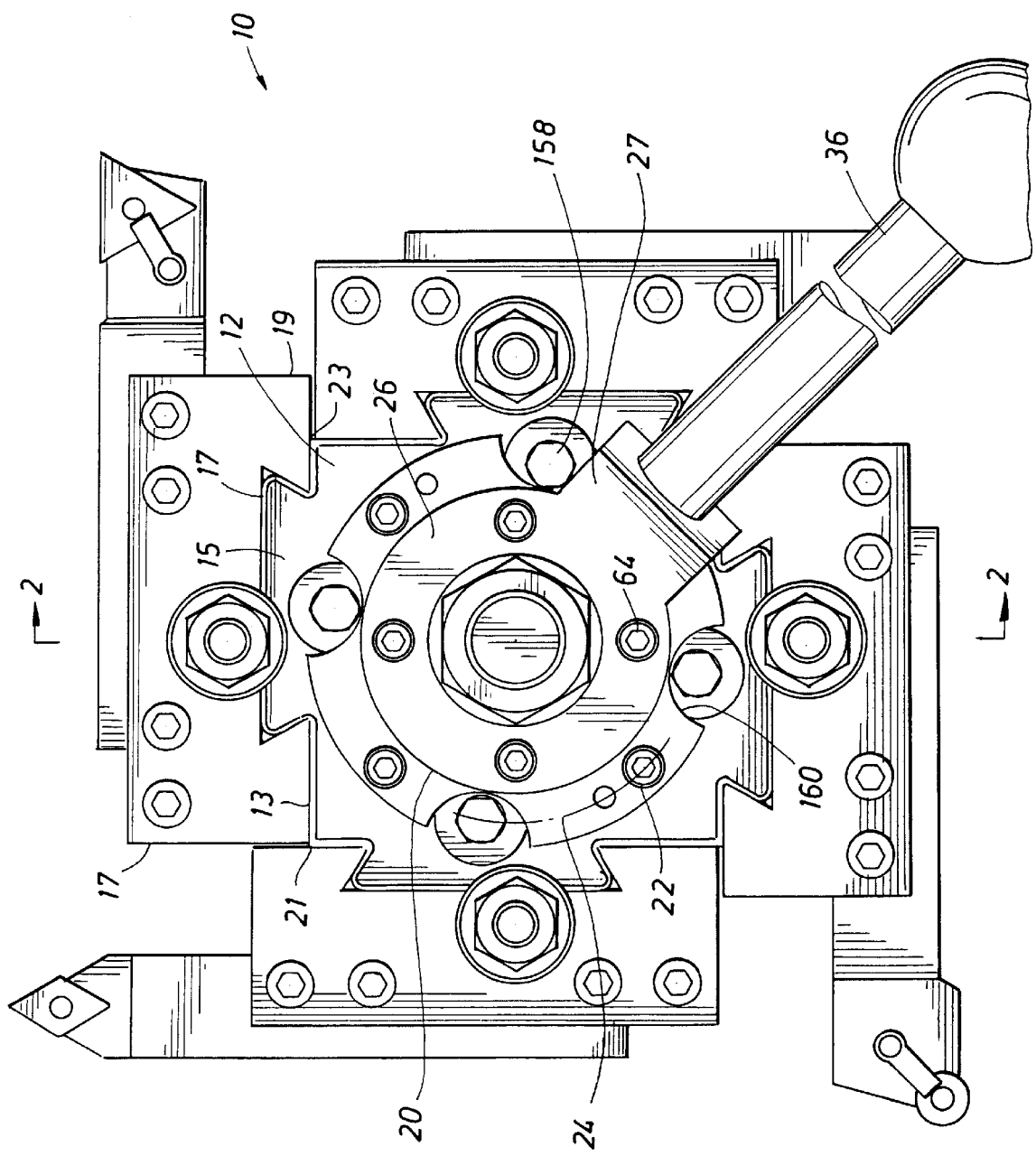
Figure 2:
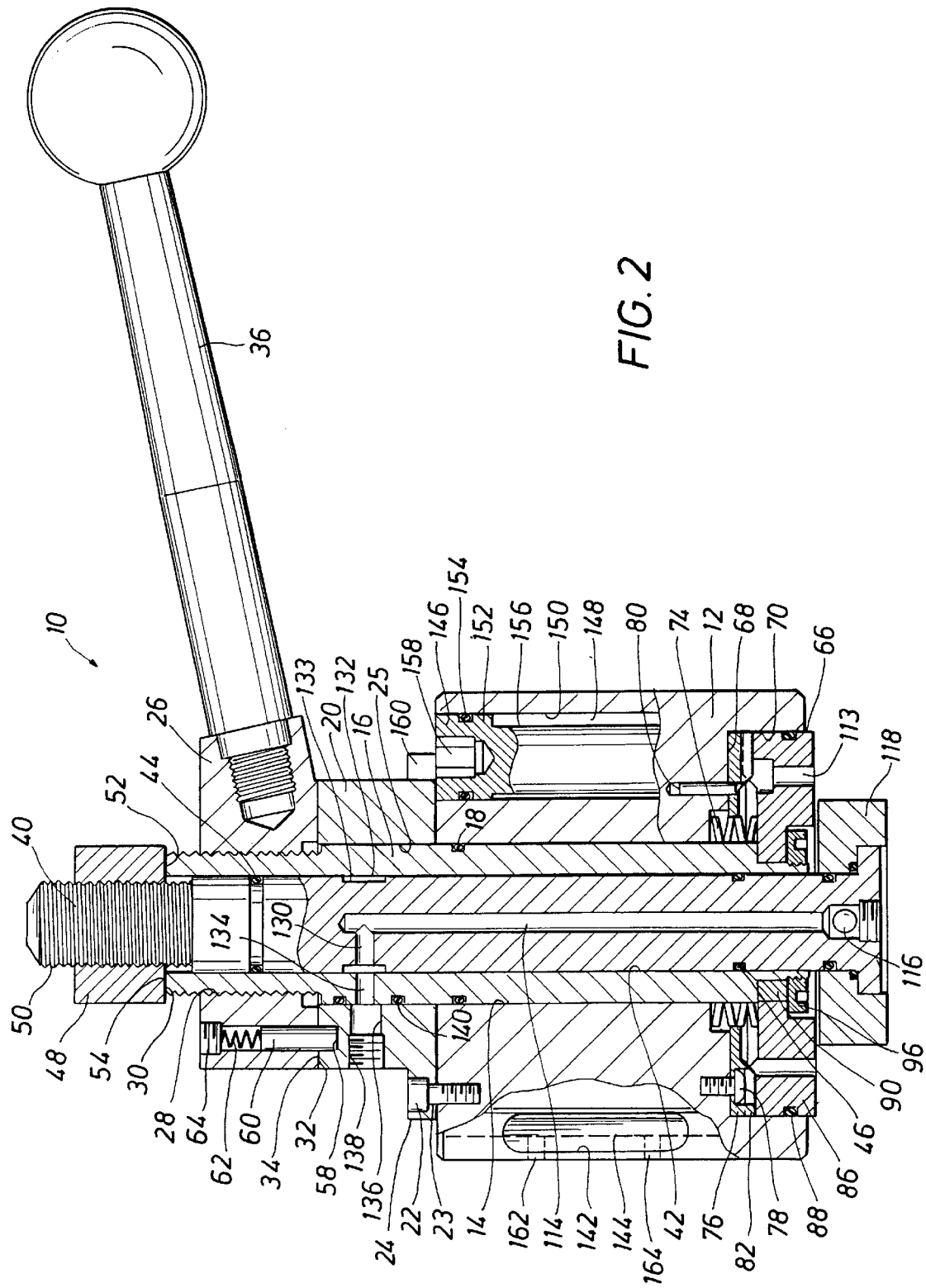
Figure 3:
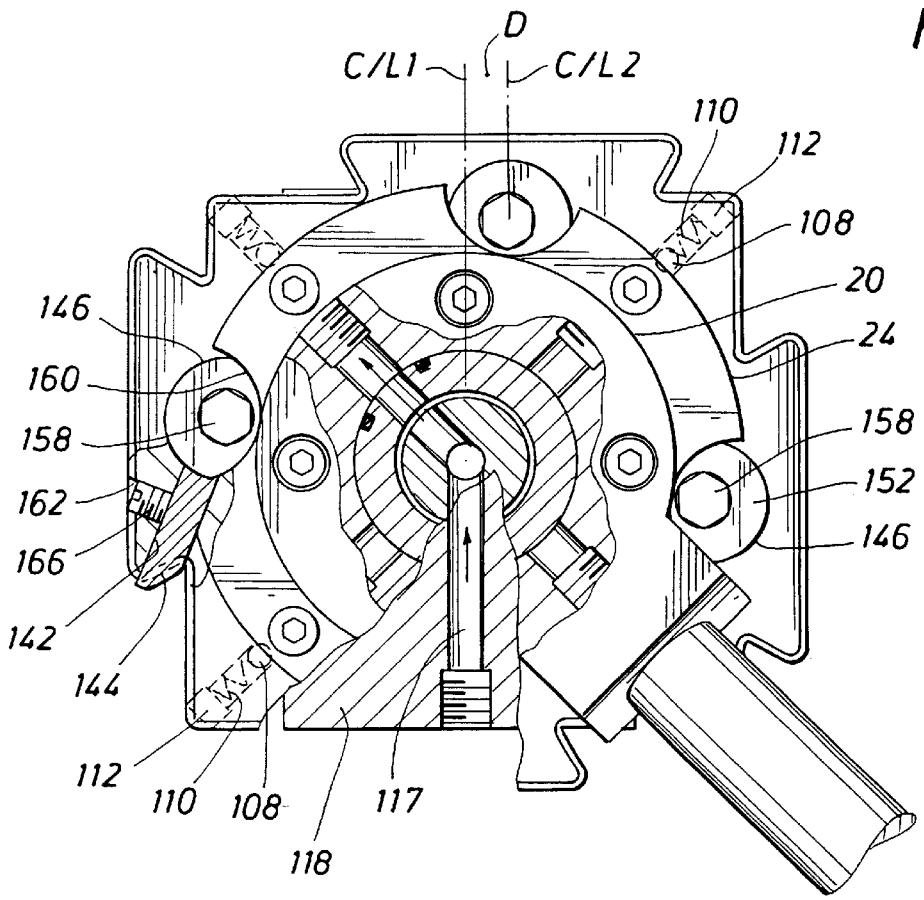
Figure 5:
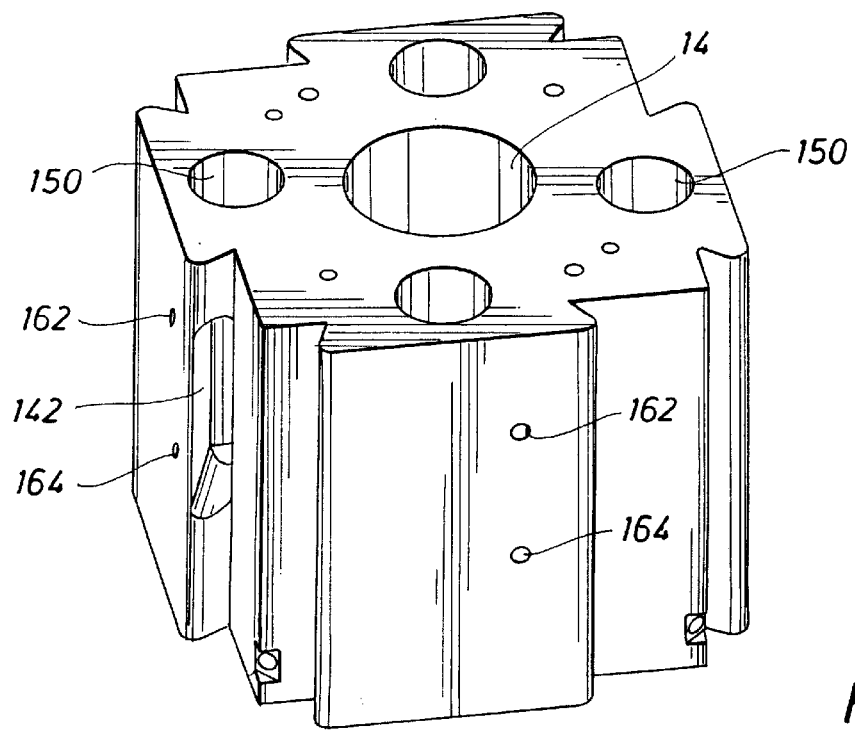
Figure 4:
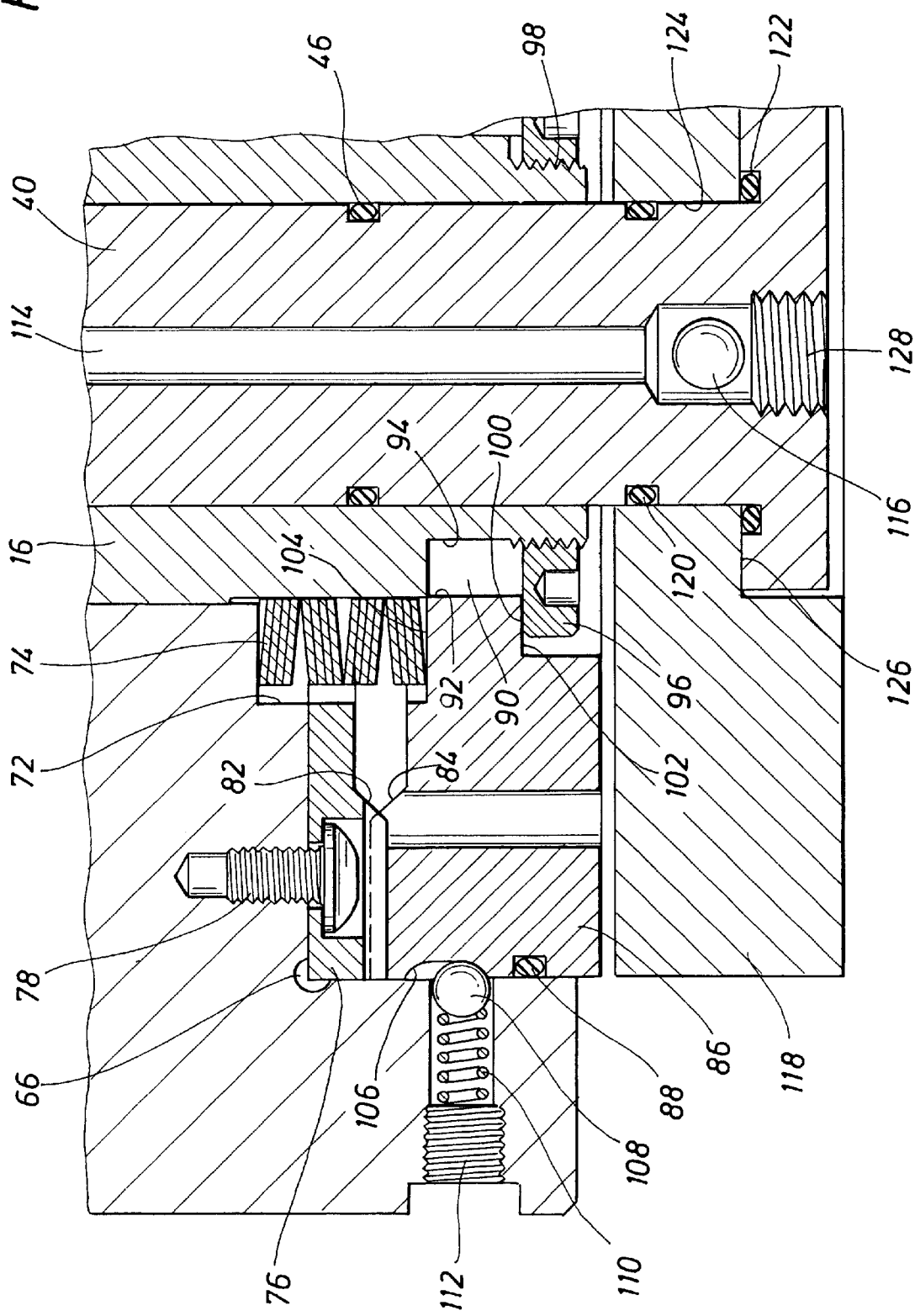
Figure 6:
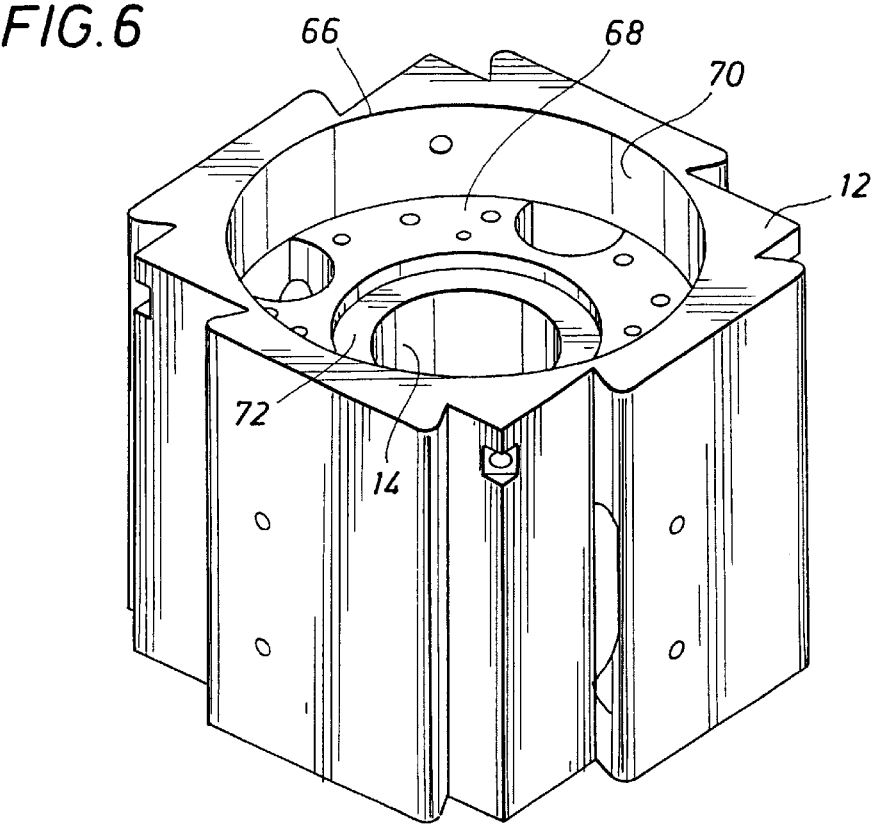
Figure 7:
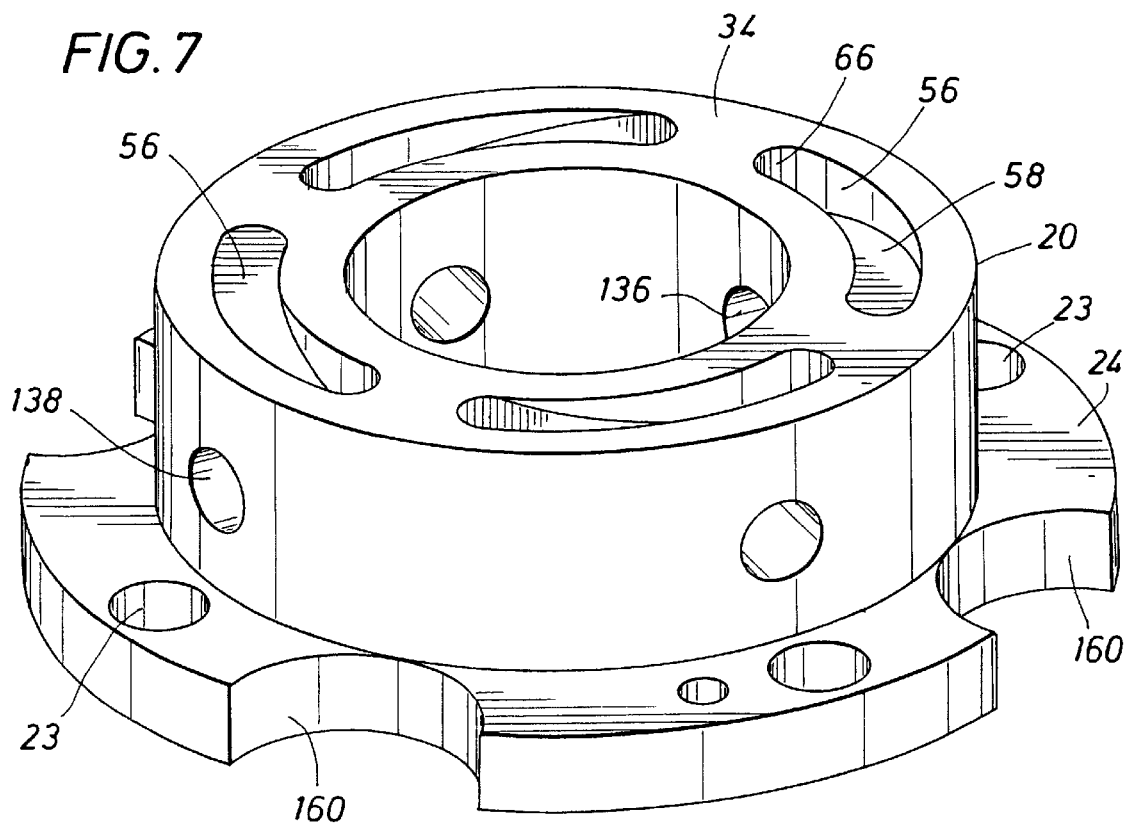
Figure 8:
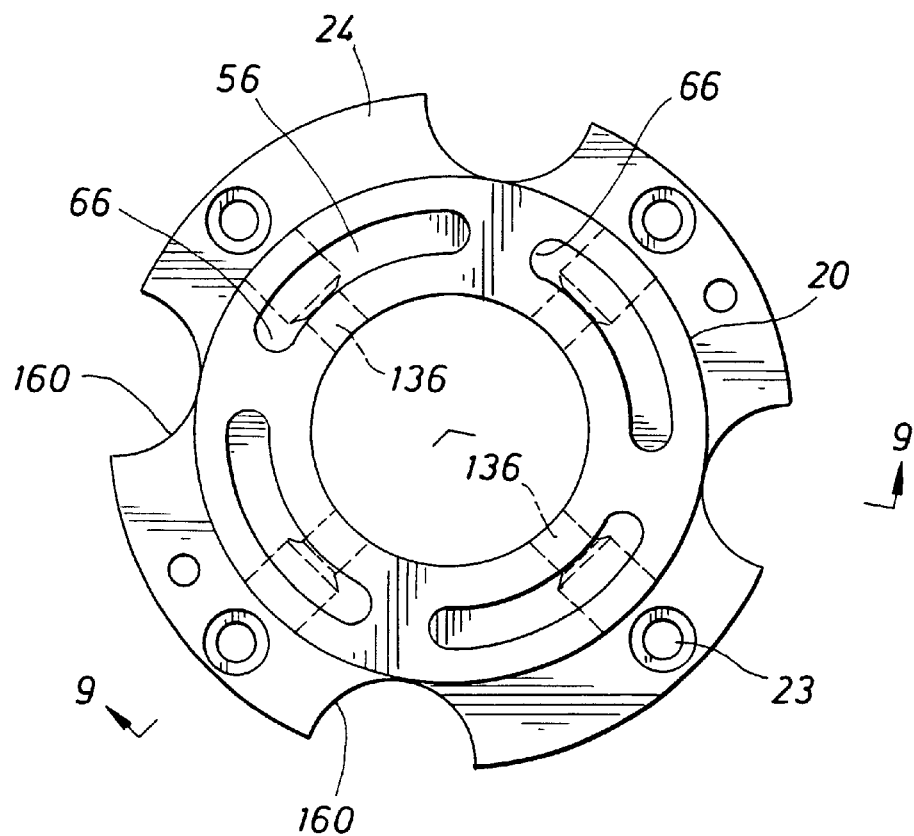
Figure 9:
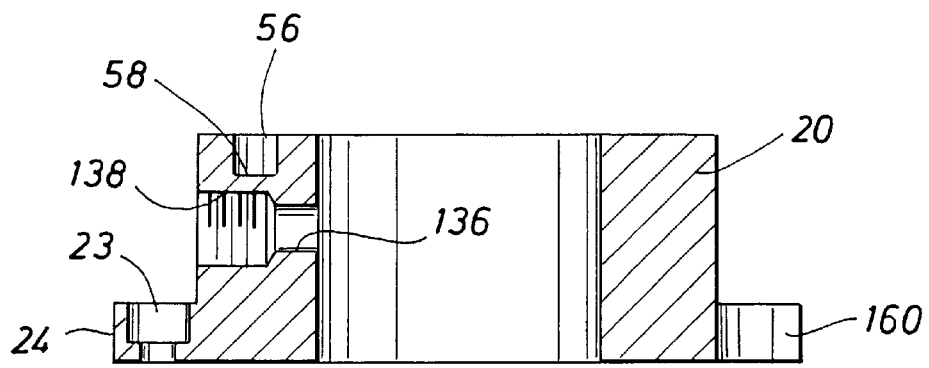
Figure 10:
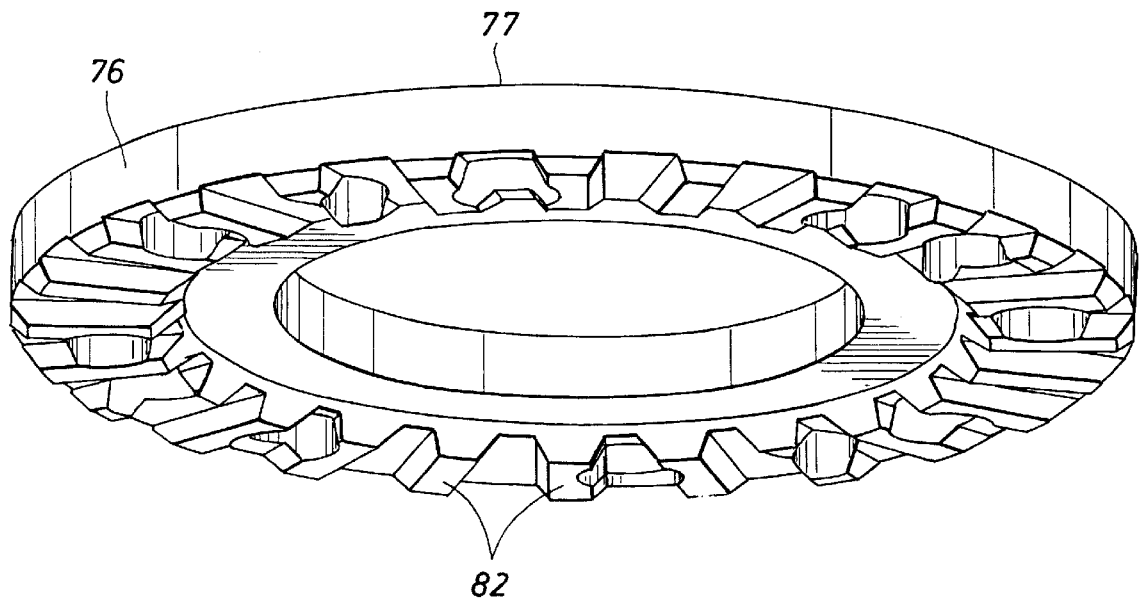
Figure 11:
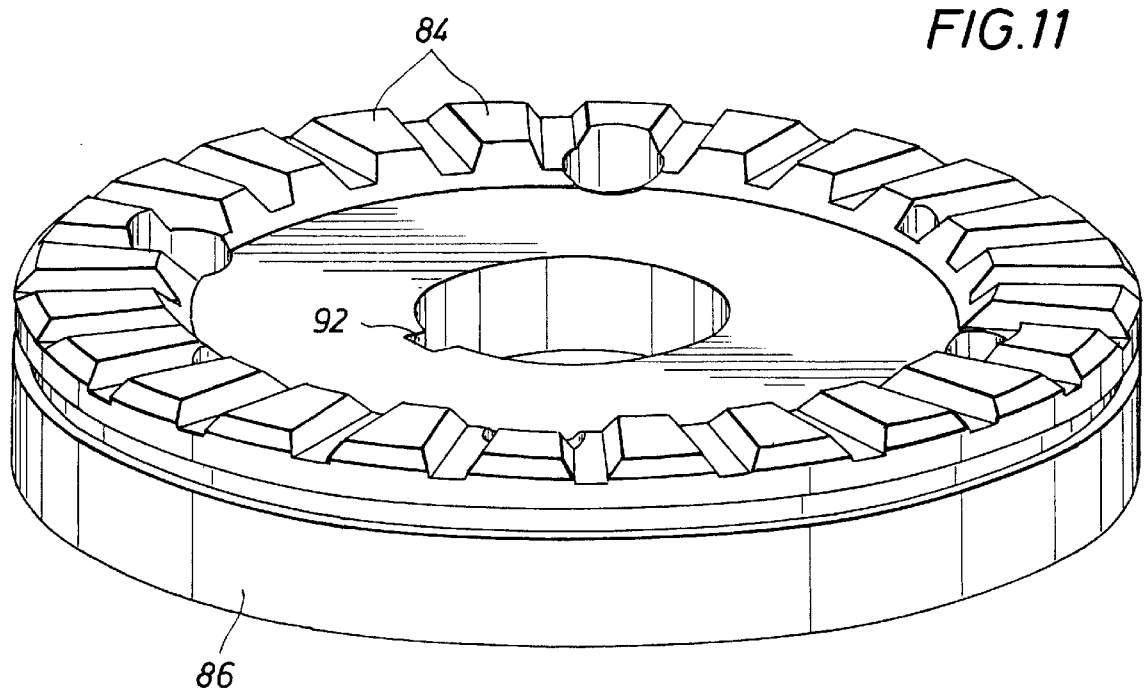
Figure 12:
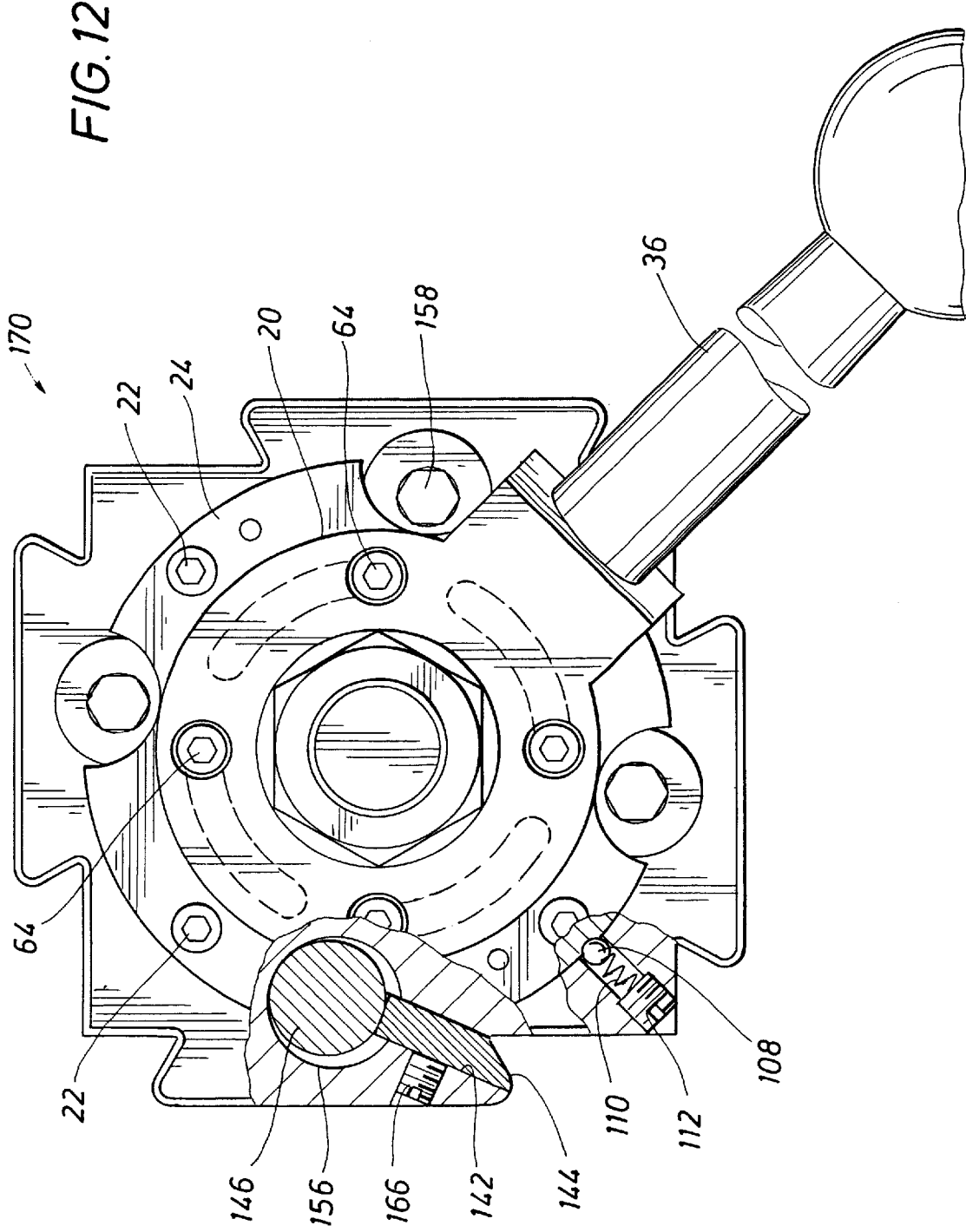
Figure 13:
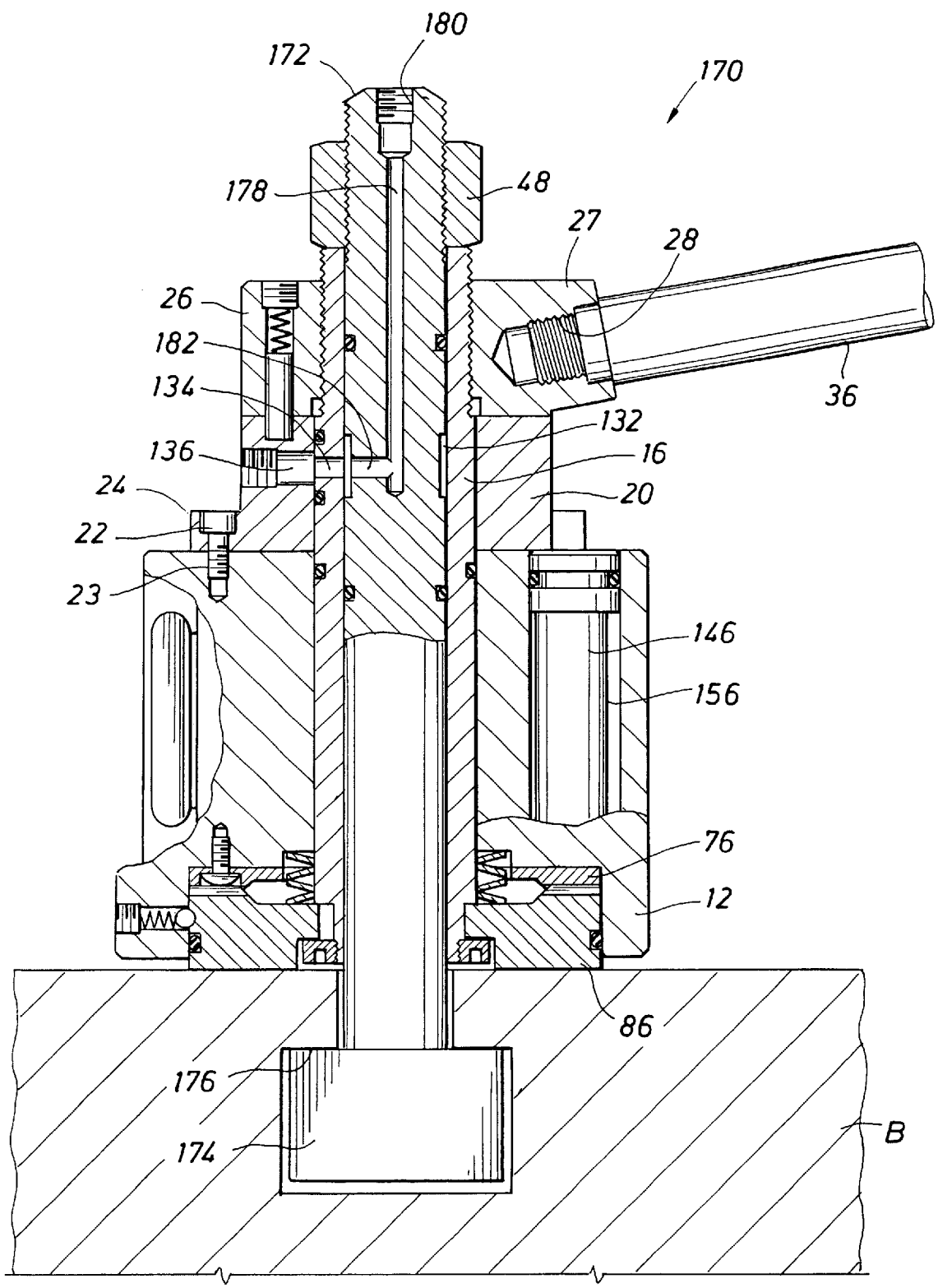
Figure 14:
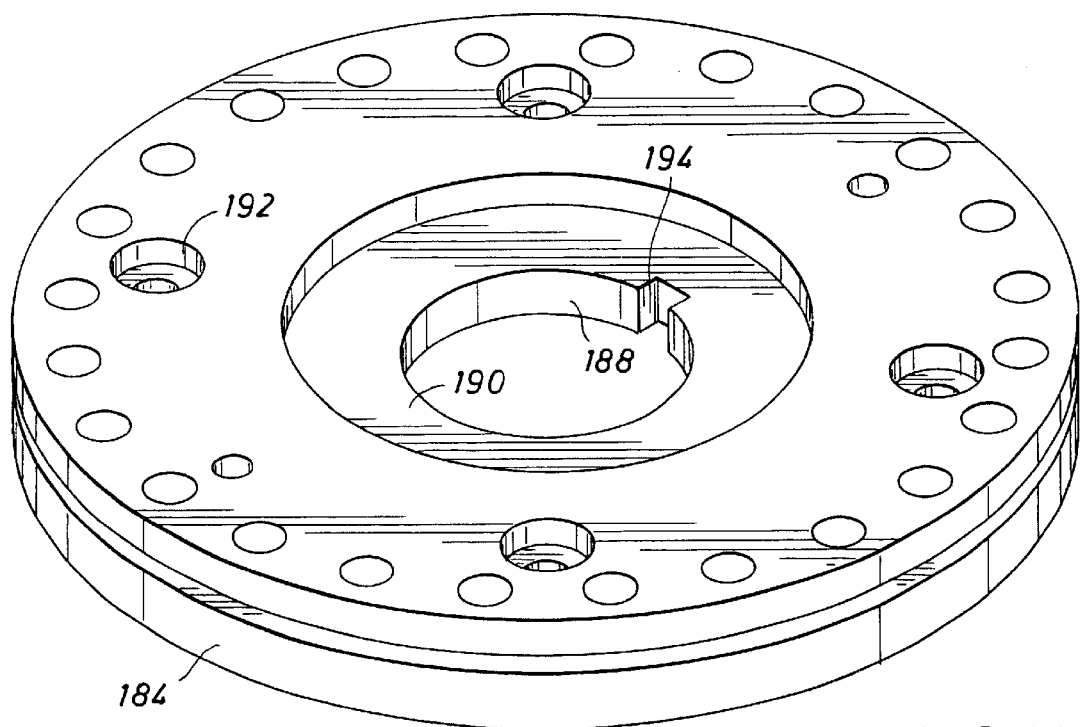
Figure 15:
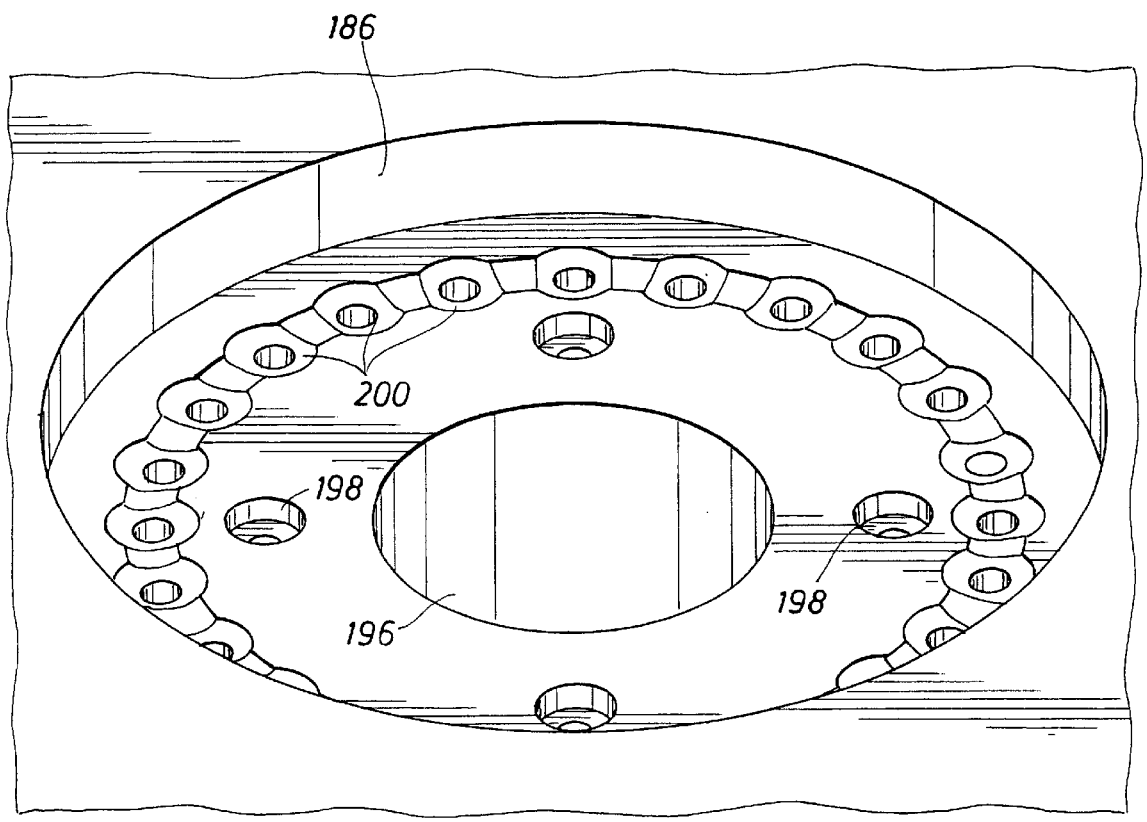

FIG. 1 is a plan view of a quick-change tool post which is constructed in accordance with the principles of the present invention and represents the preferred embodiment and best mode of the present invention;

FIG. 2 is a longitudinal sectional view taken along line 2—2 of FIG. 1 and showing the tool post with the tool holders and tools removed therefrom;

FIG. 3 is a partial sectional view taken in plan and having parts thereof broken away and shown in section for illustrating tool post construction and its internal coolant channels;

FIG. 4 is a fragmentary sectional view of the lower portion to the tool post mechanism of FIG. 1 and showing the indexing mechanism and coolant channel in detail;

FIG. 5 is an isometric illustration of the body structure of the tool post mechanism of FIGS. 1–3 as viewed from the top;

FIG. 6 is an isometric illustration of the body structure of the tool post mechanism of FIGS. 1–3 as viewed from the bottom;

FIG. 7 is an isometric illustration of the indexing head structure of the tool post mechanism of FIGS. 1–3;

FIG. 8 is a plan view of the indexing head structure of the tool post mechanism of FIGS. 1–3;

FIG. 9 is a sectional view indexing head structure of the tool post mechanism of FIGS. 1–3, the FIG. being taken along line 9—9 of FIG. 8;

FIG. 10 is an isometric illustration of the top indexing spline of the indexing mechanism of the tool post of FIGS. 1–3 as seen from the bottom thereof;

FIG. 11 is an isometric illustration of the bottom indexing spline of the indexing mechanism of the tool post of FIGS. 1–3 as seen from the bottom thereof;

FIG. 12 is a plan view of an alternative embodiment of the present invention, with parts thereof broken away and shown in section;

FIG. 13 is a longitudinal sectional view of the alternative embodiment of the present invention taken along line 13—13 of FIG. 12;

FIG. 14 is an isometric illustration as seen from above and showing a top spline of an indexing mechanism which represents an alternative embodiment of the present invention; and FIG. 15 is an isometric illustration as seen from below and showing a bottom spline of an indexing mechanism which is designed for indexing engagement with the top spline of FIG. 14.

DETAILED DESCRIPTION OF PREFERRED EMBODIMENT

Referring now to the drawings and first to FIGS. 1 and 2, a quick-change tool post mechanism is shown generally at 10 which, in FIG. 1 is shown to have a plurality of conventional rectangular tool support elements 14 in assembly therewith and with various metal working tools being supported by the respective tool support elements. In FIG. 2, the tool post mechanism is simplified, to facilitate understanding of the invention, in that no tool support elements or metal working tools are shown in supportive connection therewith. The tool post mechanism incorporates a generally rectangular tool post body 12 defining a plurality of generally rectangular tool support faces 13, each establishing a defined height and width. Four tool support faces are defined by the generally rectangular tool post body shown in the drawings, but indexing tool posts having other configurations and including more than four tool support faces may also embody the principles of the present invention. The tool support faces 13 each define a generally vertical centerline shown at c/l 1 in FIG. 3. The generally rectangular tool post body also defines a plurality of external dovetail connections 15 each having a generally rectangular planar dovetail face surface 17. Each dovetail face surface 17 defines a centerline c/l 2, also shown in FIG. 3. Each of the dovetail connections 15 is offset laterally from the centerline c/l 1 of the generally rectangular tool support faces and thus the centerline c/l 2 of the dovetail face surfaces 17 of each of the dovetail connections is offset laterally by a distance D from the centerline c/l 1 of the respective tool support faces 13. As is evidenced by FIG. 1, the generally rectangular tool support elements 1–4 are of essentially the same width as the overall width of the tool post body 12 and greater than the defined width of the generally rectangular tool support faces 13 of the tool post body 12. Because of this typically standard width of the tool support elements, and because the width of a tool post must be kept to a minimum, four standard tool support elements cannot be supported at each of the tool support faces of a rectangular tool post body, because the side edges 17 and 19 thereof will interfere with one another. By locating the external dovetail connections 15 in laterally offset relation with respect to the tool support faces 13, the rectangular tool support elements will be supported in a manner that one of the side edges 17 thereof is essentially in alignment with one of the side edges 21 of each tool support face 13 and the opposite side edge 19 thereof projects beyond the opposite side edge 23 of the tool support face 13. This arrangement of tool supports causes each of the tool supports to be located in overlapping relation with an adjacent tool support so that the respective side portions thereof do not interfere with the side edge of the adjacent tool support.

The generally rectangular tool post body defines a centrally located bore 14 having a tubular indexing post 16 located therein and being sealed with respect thereto by an O-ring seal member 18 carried within an annular seal groove defined in the outer periphery of the tubular indexing post. An indexing head 20 is secured in fixed relation with the tool post body 12 by means of a plurality of retainer bolts or cap screws 22 which extend through openings 23 of a retainer flange 24 which projects radially outwardly from the lower portion of the indexing head. It should be borne in mind that the indexing head 20 may, if desired, be an integral structure of the tool post body. The geometry of the indexing head is also shown in detail in the isometric illustration of FIG. 7. A locking/unlocking nut or actuator 26 has a lateral handle projection 27 and having an internally threaded section 28 within which is received an externally threaded section 30 defining the upper end portion of the tubular indexing post 16. The locking nut 26 also defines a lower, generally planar surface 32 which is disposed in bearing engagement with an angular, generally planar surface 34 defining the upper end of the indexing head 20. The actuator or locking nut member 26 is provided with an actuating handle 36, also referred to herein as a locking handle, which is threadedly received within a handle receptacle 38 that is defined by handle projection 27 of the locking nut member.

A holding post 40 extends in closely fitting relation through an internal passage or bore 42 of the indexing post 16 and is sealed with respect to the indexing post by upper and lower seal members 44 and 46 which are retained within annular seal grooves defined in the outer periphery of the holding post. A retainer nut 48 which is preferably of the flanged variety is received by an externally threaded section 50 at the upper end of the holding post 40 and defines a circular retaining shoulder surface 52 having retaining engagement with a circular, planar upper end surface 54 of the tubular indexing post 16. As is evident from FIG. 7, the upper circular region of the indexing head 20 defines a plurality, typically four arcuate indexing recesses 56, each defining an inclined arcuate ramp 58 which is engaged by a detent member 60 in the manner shown in FIG. 2. The detent member 60 is urged by a spring 62 against the inclined ramp surface 58. The detents and detent actuating springs are retained within detent receptacles of the locking/unlocking actuator nut 26 by threaded retainer elements 64 which are received by threaded openings of the nut member 26. As the locking actuator handle 36 is moved counter-clockwise during unlocking rotation of the nut member 26, the detent members 60 are caused to move against respective groove end or stop shoulders 66 which are defined by ends of the arcuate indexing recesses 56. When this position is reached, the locking/unlocking nut 26 cannot be rotated further. Thus, the end shoulder 66 functions as a stop shoulder to limit rotational movement of the nut 26 to about 90°. It should be borne in mind that unlocking or release of the indexing mechanism occurs as the locking or actuator nut is rotated counter-clockwise on the threaded section of the indexing post. Before the detents 60 reach the stop shoulders release of the indexing mechanism caused by separation of locking splines will have occurred. This permits the tool post mechanism to be free for rotation either clockwise or counter-clockwise. Thus, when the detents move into contact with the stop shoulders 66, further counter-clockwise motion of the actuator nut 26 by the handle 36 will cause counter-clockwise rotational movement of the indexing post mechanism for selectively positioning a metal working tool supported by one of its tool holders in position relative to the workpiece. When unlocking or release of the indexing mechanism has occurred, the tool post can be rotated counter-clockwise by manual force on the actuating handle or the tool post may be rotated manually in the clockwise direction assuming the actuating handle is not used. When the locking handle 36 is rotated in the opposite direction, or clockwise, locking of the indexing mechanism will occur as linear movement of the indexing post causes movement of the locking splines into interengaging relation. As locking handle and locking nut rotation in the clockwise direction occurs from the stop shoulder 66, the detent elements 60 will traverse up the inclined ramp 58 until such time as the detents reach the planar upper end surface 34 of the indexing head 20. Further clockwise rotation of the locking actuator nut 26 will cause the spring loaded detents to fall into the deep ends of the next succeeding arcuate slots 56, so that it then may again be rotated counter clockwise. This causes a ratcheting condition to occur, where the actuating or locking handle 36 is moved rotationally back and forth through an arc of about 90° to successively advance the indexing post and its metal working tools. Rotational movement of the locking or actuating nut member 26 by the locking handle 36 causes the nut member 26 to traverse the externally threaded section 30 of the indexing post 16. This activity causes upward or downward relative movement of the indexing post 16 with respect to the holding post 40, tool post body 12 and indexing head 20 and causes the locking splines to engage for locking of the tool post body 12 or to disengage to permit the tool post mechanism to be rotated for tool repositioning.

At its bottom, as shown in FIG. 2 and in the bottom isometric view of FIG. 6, the tool post body 12 defines an indexing receptacle 66 having a circular, planar surface 68 and a cylindrical surface 70. The tool post body also defines a circular recess 72 which serves as a spring recess receiving the uppermost one of the circular disc springs 74. A circular, upper spline member 76 is retained within the indexing receptacle by a plurality of retainer screws 78 that secure a planar upper surface of the upper spline member in face to face relation with the planar downwardly facing surface 68 as shown in FIG. 2. One or more indexing pins 80 are located within indexing openings of the tool post body 12 and the upper spline member 76 to insure precise alignment of the upper spline member with respect to the tool post body. The upper spline member defines an anular array of downwardly facing spline teeth 82 which are presented for inter-engaging locking relation with a circular array of upwardly facing spline teeth 84 of a lower spline member 86 which is shown in FIG. 2 and also shown in detail in the isometric illustration of FIG. 11. The lower spline member 86 is sealed with respect to the internal cylindrical surface 70 of the indexing receptacle 66 by an anular O-ring type sealing element 88 which is retained within an anular seal groove defined in the outer circumference of the lower spline member 86. The lower locking spline element 86 is maintained in non-rotatable relation with respect to the indexing post 16 by a key member 90 which is received by a key slot 92 shown in FIGS. 4 and 11 and a corresponding key slot 94 which is defined in the indexing post 16. As further shown in FIG. 4, a lower spline retainer nut 96 is received by an externally threaded section 98 of the indexing post 16 and provides an upwardly facing retainer shoulder 100 which engages a downwardly facing anular shoulder 102 of the lower spline member 86 to support the lower spline member and the spline 90 from inadvertent disassembly from the indexing post. The lower spline member 86 also defines a circular spring depression 104 which is shown in FIG. 4 and which provides for location of the lower disc spring of the disc spring stack 74. As shown in FIGS. 3 and 4, the lower spline member 86 defines a plurality of detent grooves 106 in the outer periphery thereof which are oriented at about 90° intervals. Each of the detent grooves 106 receives a ball detent member 108 to ensure retention of the lower spline member 86 in assembly within the indexing receptacle 66 and to function as a positioning stop or rotational index permitting the operator of the machine to accurately stop rotation of the indexing post when it has reached a desired rotational position. The detent slots 106 are vertically elongated as shown in FIG. 4 to thereby permit upward or downward relative linear movement of the lower spline 86 between the locked position shown in FIG. 4 and unlocked or release position where the teeth 84 of the lower spline member 86 are disengaged from interlocking relation with respect to the downwardly facing spline teeth 82 of the upper spline member 76. Each of the ball detents 108 is driven by a detent spring 110 which is maintained in compression by a spring retainer element 112 that his threadedly received within detent receptacle. The spring urged ball detents are arranged at angular intervals of 90° so that the tool post body 12 will be click stopped at rotational positions relative to the lower locking spline which position the metal working tools supported by its tool supports at operative positions relative to the work piece being rotated by the lathe or other machine tool.

The holding post 40 will typically secure the lower, planar surface of the lower locking spline 86 in contact with the upper planar surface of the machine tool bed, with sufficient frictional engagement to maintain the lower spline against movement on the machine tool bed. In most cases, no additional tool post restraint is needed. In the event, however, the tool being supported by a tool holder of the tool post is engaged in very heavy cutting of a rotating workpiece, additional tool post support may be desired. The lower spline element 86 thus defines a plurality of bolt holes 113 to receive bolts which secure the lower spline element to the bed of the machine tool. The upper portions of these bolt holes are enlarged as shown in FIG. 2 so that the retaining elements may take the form of cap screws, enabling the heads of the cap screws to be recessed with respect to the upper surface of the lower locking spline. Also, if desired, nuts may be located within the recesses of the bolt holes, thus enabling restraining bolts to be extended upwardly through the bed of the machine tool and threaded into the retainer nuts.

As mentioned above, the quick-change indexing tool-post mechanism of the present invention is provided with a coolant supply system to supply coolant through the tool post mechanism to a selected coolant channel through which coolant fluid being supplied by the coolant system of the machine tool is directed only to the metal working tool that is in operation at any point in time. As shown particularly in FIGS. 2, 3 and 4, the holding post 40 is drilled to define a longitudinal coolant supply passage 114 which is in communication with a laterally oriented coolant supply passage or port 116 extending laterally through the holding post. The coolant supply port 116 is in communication with a coolant supply channel or passage that extends through a T-nut 118 which in turn receives coolant flow from a coolant supply source of the machine tool. Annular O-ring type seals 120 and 122 are carried by annular seal grooves of the holding post 40 and establish sealing relation with annular surfaces 124 and 126 of the T-nut member 118 and serve to isolate the pressurized coolant to the coolant supply system of the tool post mechanism and prevent its leakage along the holding post. The lower end of the coolant supply passage 114 is closed by a threaded plug member 128. At its upper end, the longitudinal coolant supply passage 114 intersects a lateral coolant passage 130 which is in communication with an annular recess 132 which cooperates with the internal cylindrical surface 42 of the indexing post 16 to define an annular space or annulus 133 receiving coolant from the transverse coolant supply channel or port 130. The recess 132 and the annulus that it defines is of greater longitudinal dimension as compared with the dimension of a coolant port 134 of the indexing post 16. This feature permits optimum coolant communication to be maintained between the coolant supply passage 114 and the coolant port 134 regardless of the rotary or linear relative positions of the holding post 40 and the indexing post 16. The coolant port 134 is in communication with a coolant output passage 136 of the indexing head 20. The output passage 136 is threaded as shown at 138, which permits a coolant conduit to be threaded to the indexing head to provide for transportation of coolant to the immediate site of metal working engagement with the work piece being rotated by the metal working machine. To prevent leakage of coolant fluid along the indexing post and indexing head interface, a O-ring seal 140 is retained within a seal groove that encircles the coolant supply port 134 and establishes sealing engagement with the internal cylindrical surface 25 of the indexing head 20.

As mentioned above, it is desirable that each of the laterally offset dovetail connections of the rectangular tool post body 12 have the capability of easily permitting linear assembly of a conventional rectangular tool support to the tool post body and yet establishing a tight, extremely stable gripping relation with the tool holder that is involved to thus insure the stability of each of the metal working tools being supported by the tool holders. As shown, particularly in FIGS. 2 and 3, each of the offset dovetail connections defines a gib receptacle 142 having a plate-like gib member 144 movably located therein. A gib actuator element 146 is located within an actuator receptacle or bore 148 which is defined by a cylindrical internal surface 150 having intersection with the gib receptacle. The actuator element has upper and lower cylindrical ends, the upper end 152 thereof being shown in FIG. 2, which establish journaled relation with respect to the cylindrical internal surface 150. These cylindrical journal ends are sealed with respect to the internal cylindrical surface 150 by a circular O-ring type sealing element 154. The gib actuator element 146, intermediate the cylindrical ends, defines an eccentric actuator surface 156 which is engaged by the inner end of the plate-like gib member 144. Linear movement of the member in the outward direction for expanding or tightening the dovetail connection is accomplished by rotation of the gib actuator element 146 within its receptacle 148. Typically, the upper end of the gib actuator element defines a socket receptacle 158 which is adapted to receive an Allen wrench or any other suitable actuator rotating tool or implement. For access to each of the socket receptacles 158, the retainer flange 24 of the indexing head 20 defines a plurality of wrench access recesses 160 which, as shown in FIG. 3, are of arcuate configuration but may be of any other suitable configuration, if desired.

After the rectangular tool mounting elements 1, 2, 3 or 4 have been positioned with the dovetail connections thereof in assembly with the dovetail connections of the body 12, as shown in FIG. 1, a socket wrench such as an Allen wrench is inserted within the socket receptacle 158 and the gib actuator element 146 thereof is rotated, causing the eccentric actuator surface 150 to impart driving movement to the plate-like gib member 144. This linear gib movement essentially enlarges the dovetail connection of the tool post body and establishes a tight and stable gripping relation of the dovetail connections to thereby support the respective tool holder in essentially rigid assembly with the tool post body. After the gib element has been moved to tighten the dovetail connection, it should be locked or retained in its expanded position until such time as the tool support element is removed. To accomplish this feature, each of the dovetail connections of the tool post body are provided with internally set screw holes 162 and 164 as shown in FIG. 5 and set screws 166 are engaged by an Allen wrench or the like and rotated to securely retain the gib member against movement within its receptacle. Each of the tool holder elements 1–4 will be provided with openings so that an allen wrench or other suitable implement can be extended through the openings for access to the set screws 166.

Operation:

The quick-change tool post mechanism of the present invention is shown in the locking position thereof in FIGS. 1, 2 and 3. In this position, the locking/unlocking nut 26 will have been driven clockwise to its full extent thus moving the nut 26 downwardly relative to the tubular indexing post 16. Since downward movement of the nut 26 is prevented by engagement of the lower planar surface 32 of the nut with the upper planar surface 34 of the indexing head 20, clockwise locking rotation of the nut 26 will move the indexing post 16 upwardly thereby compressing the disc spring stack 74 and causing movement of the spline teeth 84 of the lower spline member 86 into locking inter-engagement with the downwardly facing spline teeth 82 of the upper, fixed spline member 76. When in the locking position as shown in FIGS. 1–4, the tool post body 12 will not be allowed to rotate about the holding pin 40. With the tool post body secured against rotation, machine operations may be conducted with one of the metal working tools supported by one of the tool holders 14 in metal working engagement with a work piece being rotated by the machine tool. After this metal working operation has been completed, it will be desirable to unlock the tool post mechanism and rotate it to a position orienting another selected metal working tool of another tool holder in operative relation with the rotating work piece.

To accomplish unlocking of the quick-change indexing tool post mechanism, the machine operator will grasp the unlocking handle 36 and will move it in a manner causing counter-clockwise unlocking rotation of the internally threaded locking/unlocking nut 26. This counter-clockwise rotation essentially causes the threaded nut 26 to traverse upwardly with respect to the external threaded section 30 of the indexing post 16. As the nut 26 traverses upwardly along the indexing post, the compressed disc spring packet or stack 74 will expand thereby driving the lower spline member 86 and the indexing post 16 downwardly so that disengagement of the spline teeth 82 and 84 begins to occur. After the nut 26 has been rotated sufficiently counter-clockwise that the lower, movable spline member 86 will have been driven downwardly by the spring stack to the extent that complete separation of the spline teeth 82 and 84 has occurred, the tool post body 12 will be in its release condition and thus free to rotate for positioning a selected metal working tool in operative relation with the rotating work piece. A unique feature about this unlocking movement is that a first increment of counter-clockwise rotation of the nut 26 by the locking handle 36 accomplishes unlocking of the splines. When the splines have been unlocked, the unlocking handle 36 may be further moved counter-clockwise until the detent 60 has come into contact with the end shoulder 66 of the respective arcuate slots 56 in the indexing head 20. Thereafter, continued counter-clockwise rotation of the locking handle 36 will simply rotate the tool post body 12 until a selected machining position has been achieved. Thus, the locking handle is moveable through a first increment of counter-clockwise rotation for unlocking of the indexing mechanism and is then moved through a second increment of counter-clockwise rotation to achieve desired positioning of the tool post mechanism. Thus, unlocking and rotation of the tool post is accomplished by a single movement of one hand of the machinist, thereby minimizing the time and manual movement that is necessary for repositioning of the tool post.

It is possible to achieve rotational tool post positioning by moving the actuating handle in a back and forth ratcheting movement. Counter-clockwise movement of the actuating handle achieves unlocking of the tool post and rotation of the tool post. When the actuating handle is rotated in the opposite or clockwise direction locking of the indexing mechanism occurs. When the tool post restrained by the locking mechanism, further clockwise movement of the actuating handle causes the spring loaded detents to traverse up the inclined ramps of the arcuate slots to the planar upper surface 34 of the indexing head. When moved further clockwise, the detents will fall into the next succeeding arcuate slots. From this position, the actuating handle can then be moved counter-clockwise for unlocking and rotation of the tool post mechanism. This back and forth ratcheting movement may be repeated until the desired position of the tool post has been achieved. It should also be borne in mind that after the tool post mechanism has been unlocked by separation of the spline teeth of the upper and lower spline members, it may also be rotated clockwise if clockwise rotation is the shortest arcuate distance of movement for achieving desired tool positioning and if the locking handle is not used to accomplish such rotation.

Alternative Embodiments:

Referring now to FIGS. 12 and 13, a quick-change indexing tool post mechanism is shown generally at 170 and differs from the embodiment discussed above in connection with FIGS. 1–11 by the configuration of a holding post 172 thereof Like referenced numerals in FIGS. 12 and 13 have been utilized for corresponding parts in comparison with FIGS. 1–11. The holding post 172 has at its lower end a T-nut 174 which is adapted to be received within an undercut slot of a machine tool bed, partially shown at B in FIG. 13. Thus, the lower end of the holding post 172 is restrained against upward movement by the downwardly facing movement of the shoulders 176 of the machine tool bed B. At its upper end, the holding post 172 is drilled to define a coolant channel 178 having an internally threaded section 180 at its upper end which thereby adapts the holding post to receive the connection of a coolant supply line emanating from the coolant supply system of the machine tool. The coolant passage or channel 178 intersects a lateral coolant channel section 182 through which coolant is conducted to an annulus 132 of the character discussed above in connection with FIG. 2. From the annulus 132, coolant flowing from the lateral channel or passage 182 passes through a coolant port 184 of the indexing post 16 and thus flows into a coolant output passage or channel 136.

FIGS. 14 and 15 are isometric illustrations of alternative embodiments, respectively showing a bottom spline element 184 and a top spline element 186 of corresponding configuration. These spline elements are considered to be of less expensive manufacture as compared to the upper and lower splines 76 and 86 of FIG. 2 and therefore may be substituted for the toothed splines of the preferred embodiment. The function of the splines or locking elements is the same in either case. In the locked condition of the indexing mechanism the top and bottom splines are in locking engagement, thus retaining the tool post body against rotation. In the release condition, the splines are separated and thus the tool post is free for rotation to selectively position one of the metal working tools of the tool supports connected thereto in operative relation with the work piece being rotated by the machine tool. The bottom spline member 184 of FIG. 14 defines a central aperture 188 for receiving the lower end of the tubular indexing post in the manner shown in FIG. 2 and defines a circular recess 190 within which the lower end of the disk spring package or stack 74 is received. The bottom spline member 184 also defines a plurality of bolt receptacles 192 which receive bolts, cap screws or the like for securing the lower spline element in fixed relation with the bed structure of the machine tool. To provide for indexing control, the bottom disk defines a multiplicity of circular depressions 194 which are arranged in an evenly spaced circular array adjacent the outer periphery of the lower spline member. The circular depressions are angularly spaced with respect to the center of the central aperture so that angular indexing control may be established at least in part by the upper and lower indexing spline elements. The lower spline element 184 also defines a key slot which receives a key element 90 for securing the lower spline element in nonrotatable relation with the tubular indexing post 16.

In corresponding fashion the upper spline element 186 defines a central aperture 196 through which the tubular indexing post 16 extends and within which a portion of the disk spring stack 74 is located in the manner shown in FIG. 2. The upper spline element 186 also defines a plurality of screw openings 198 which receive retainer screws for securing the upper spline member in fixed relation within the indexing receptacle of the tool post body 12. For indexing relation with the lower spline member 184 the upper spline element 186 defines a circular evenly spaced array of spline projections 200 which have substantially identical, but mirror image geometry as compared with the circular depressions or spline receptacles 194 of the lower spline member shown in FIG. 14. When the spline projections 200 of the upper indexing spline are positioned within the spline receptacles of the lower indexing spline a locking condition is established for the quick change indexing tool post mechanism which prevents rotation of the tool post body about the indexing post.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A quick-change indexing tool post, comprising:

a generally rectangular tool post body having a plurality of generally rectangular tool support faces each defining a substantially vertical centerline;

a plurality of external tool post body dovetail connections each being defined by one of said generally rectangular tool support faces and each having a substantially vertical centerline being laterally offset with respect to said substantially vertical centerline of a respective generally rectangular tool support face;

a holding post extending through said generally rectangular tool post body and defining a pivot about which said generally rectangular tool post body is rotatable, said post being adapted for releasable mounting in fixed relation with a machine tool bed;

an interlocking indexing mechanism having a locking condition maintaining said generally rectangular tool post body in substantially immovable relation with said holding post and the machine tool bed and having a release condition permitting rotation of said generally rectangular tool post body about said holding post to a desired position;

a plurality of generally rectangular tool support members each defining an internal tool support dovetail connection being receivable in interfitting relation by respective ones of said plurality of external tool post body dovetail connections; and said plurality of generally rectangular tool support members each having a width substantially equal to the width of a respective tool support face of said generally rectangular tool post body and being positioned by the respective laterally offset dovetail connection of said generally rectangular tool post body with one side thereof extending beyond a respective side of said generally rectangular tool post body.

2. The quick-change tool post of claim 1, comprising:

said plurality of generally rectangular tool support members being supported by said plurality of dovetail connections with one side thereof disposed in overlapping relation with a side of an adjacent generally rectangular tool support member.

3. The quick-change tool post of claim 1, said interlocking indexing mechanism comprising:

a tubular indexing post being located about said holding post and being movable relative thereto;

a first indexing element being immovable with respect to said generally rectangular tool post body;

a second indexing element being fixed to said tubular indexing post and establishing nonrotatable engagement with said first indexing element at said locking condition and being separated from said nonrotatable engagement with said first indexing element at said release condition; and an indexing actuator being manually movable relative to said generally rectangular tool post body and imparting locking and releasing movement to said tubular indexing post for selective locking and releasing movement of said second indexing element relative to said first indexing element.

4. The quick-change indexing tool post of claim 3, comprising:

said first indexing element defining a first circular array of spline elements; and said second indexing element defining a second circular array of spline element adapted for selective non-rotatable engagement with said first circular array of spline element.

5. The quick-change indexing tool post of claim 4, comprising:

said first indexing element being a circular spline element having first spline teeth thereon;

a plurality of retainer elements retaining said first circular spline element in fixed relation with said generally rectangular tool post body;

said second indexing element being of circular configuration and defining second spline teeth for non-rotatable engagement with said first spline teeth at said locked condition; and a key and a retainer maintaining said second spline element in fixed relation with said tubular indexing post.

6. The quick-change indexing tool post of claim 3, wherein said indexing actuator comprising:

said generally rectangular tool post body having an indexing head defining at least one rotation control stop;

a rotary actuator nut having threaded engagement with said tubular indexing post and having force transmitting engagement with said actuator head and upon rotation causing linear movement of said tubular indexing post and said second indexing element; and at least one rotation control element being supported by said rotary actuator nut and being disposed for rotation controlling engagement with said rotation control stop.

7. The quick-change indexing tool post of claim 6, comprising:

said indexing head having at least one arcuate slot having at least one end shoulder defining said rotation control stop; and said at least one rotation control element being at least one detent element projecting into said at least one arcuate slot and disposed for stopping engagement with said at least one end shoulder of said arcuate slot.

8. The quick-change indexing tool post of claim 7, comprising:

said indexing head defining an upper surface; and said arcuate slot having an inclined bottom surface having one end thereof intersecting said upper surface of said indexing head.

9. The quick-change indexing tool post of claim 3, comprising:

spring means having force transmitting engagement with said generally rectangular tool post body and said second indexing element and urging said second indexing element toward said release condition.

10. The quick-change indexing tool post of claim 9, comprising:

said generally rectangular tool post body and said second indexing element each defining a spring seat; and said spring means being a stack of disk springs with the uppermost and lowermost ones of said stack of disk springs being seated within respective spring seats.

11. The quick-change indexing tool post of claim 1, comprising:

a tubular indexing post being located about said holding post and being movable relative thereto; and a coolant supply passage extending longitudinally through said holding post and extending through said tubular indexing post for conducting coolant fluid through said quick change indexing post to a site of metal working.

12. The quick-change indexing tool post of claim 1, comprising:

a gib receptacle being defined by each of said external tool post body dovetail connections;

a gib member being located within each of said gib receptacles and being movable therein; and a gib actuator element being located within said generally rectangular tool post body adjacent each of said external tool post body dovetail connections and having an eccentric surface thereon for driving engagement with a respective gib element for tightening said internal tool support dovetail connections with respect to said external tool post body dovetail connections.

13. A quick-change indexing tool post, comprising:

a generally rectangular tool post body having a plurality of generally rectangular tool support faces each defining a substantially vertical centerline;

a plurality of external tool post body dovetail connections each being defined by one of said generally rectangular tool support faces and each having a substantially vertical centerline being laterally offset with respect to said substantially vertical centerline of a respective generally rectangular tool support face;

a plurality of generally rectangular tool support members each defining an internal dovetail connection being receivable in interfitting relation by respective ones of said plurality of said external tool post body dovetail connections, said plurality of generally rectangular tool support members each having a width substantially equal to the width of a respective tool support face of said generally rectangular tool post body and being positioned by the respective laterally offset external tool post body dovetail connection of said generally rectangular tool post body with one side thereof extending beyond a respective side of said generally rectangular tool post body and with respective sides of adjacent generally rectangular tool support members disposed in overlapping relation;

a holding post extending through said generally rectangular tool post body and defining a pivot about which said generally rectangular tool post body is rotatable, said holding post being adapted for releasable mounting in fixed relation with a machine tool bed;

a tubular indexing post being located about said holding post and being movable relative thereto;

an interlocking indexing mechanism having a first spline being in fixed relation with said generally rectangular tool post body and a second spline being in fixed relation with said tubular indexing post, said first and second splines being relatively movable to a locking condition maintaining said generally rectangular tool post body in substantially immovable relation with said holding post and the machine tool bed and having a release condition permitting rotation of said generally rectangular tool post body about said holding post to a desired position; and an indexing actuator being manually movable relative to said generally rectangular tool post body and imparting locking and releasing movement to said tubular indexing post for selective locking and releasing movement of said second indexing element relative to said first indexing element.

14. The quick-change indexing tool post of claim 13, comprising:

said first indexing element being a circular spline element having first spline teeth thereon;

a plurality of retainer elements retaining said first circular spline element in fixed relation with said generally rectangular tool post body;

said second indexing element being of circular configuration and defining second spline teeth for non-rotatable engagement with said first spline teeth at said locked condition; and a key and a retainer maintaining said second spline element in fixed relation with said tubular indexing post.

15. The quick-change indexing tool post of claim 13, wherein said indexing actuator comprising:

said generally rectangular tool post body having an indexing head defining at least one rotation control stop;

a rotary actuator nut having threaded engagement with said tubular indexing post and having force transmitting engagement with said actuator head and upon rotation causing linear movement of said tubular indexing post and said second indexing element; and at least one rotation control element being supported by said rotary actuator nut and being disposed for rotation controlling engagement with said rotation control stop.

16. The quick-change indexing tool post of claim 15, comprising:

said indexing head defining an upper surface and having at least one arcuate slot having at least one end shoulder defining said rotation control stop, said arcuate slot having an inclined bottom surface having one end thereof intersecting said upper surface of said indexing head; and said at least one rotation control element being at least one detent element projecting into said at least one arcuate slot and disposed for stopping engagement with said at least one end shoulder of said arcuate slot.

17. The quick-change indexing tool post of claim 13, comprising:

a spring having force transmitting engagement with said generally rectangular tool post body and said second indexing element and urging said second indexing element toward said release condition relative to said first indexing element.

18. The quick-change indexing tool post of claim 13, comprising:

a plurality of generally rectangular tool support members each being of generally identical geometry and dimension and each defining a dovetail connection being receivable by respective ones of said plurality of dovetail connections;

a gib receptacle being defined by each of said external tool post body dovetail connections;

a gib member being located within each of said gib receptacles and being movable therein; and a gib actuator element being located within said generally rectangular tool post body adjacent each of said external tool post body dovetail connections and having an eccentric surface thereon for driving engagement with the respective gib element for tightening said internal tool post body dovetail connections with respect to said external tool post body dovetail connections of respective tool support members.

19. The quick-change indexing tool post of claim 13, comprising:

a coolant supply passage extending longitudinally through said holding post and extending through said tubular indexing post for conducting coolant fluid through said quick change indexing post to a site of metal working.

* * * * *

UNITED STATES PATENT AND TRADEMARK OFFICE
CERTIFICATE OF CORRECTION

PATENT NO. : 6,571,671 B1  
DATED : June 3, 2003  
INVENTOR(S) : Giannetti

Page 1 of 1

It is certified that error appears in the above-identified patent and that said Letters Patent is hereby corrected as shown below:

Column 6,  
Line 31, delete "14", and insert -- 1-4 --

Column 11,  
Line 46, delete "14", and insert -- 1-4 --

Signed and Sealed this

Sixteenth Day of September, 2003

JAMES E. ROGAN  
*Director of the United States Patent and Trademark Office*